(12) United States Patent
Nakano et al.

(10) Patent No.: US 6,507,132 B2
(45) Date of Patent: Jan. 14, 2003

(54) COMMUTATOR MOTOR WITH A VIBRATION-ISOLATING MEMBER AROUND SHAFT

(75) Inventors: Toshihiro Nakano, Hyogo (JP); Toshinori Tanaka, Tokyo (JP)

(73) Assignee: Mitsubishi Denki Kabushiki Kaisha, Hyogo (JP)

(*) Notice: Subject to any disclaimer, the term of this patent is extended or adjusted under 35 U.S.C. 154(b) by 0 days.

(21) Appl. No.: 09/851,992

(22) Filed: May 10, 2001

(65) Prior Publication Data

US 2002/0053836 A1 May 9, 2002

(30) Foreign Application Priority Data

Nov. 8, 2000 (JP) .................. 2000-340685

(51) Int. Cl.[7] ............ H02K 5/24; H02K 13/00
(52) U.S. Cl. ............ 310/51; 310/233; 310/235
(58) Field of Search ............ 310/233, 230, 310/51, 235, 236, 231

(56) References Cited

U.S. PATENT DOCUMENTS

| | | | | |
|---|---|---|---|---|
| 1,369,408 A | * | 2/1921 | Diehl | 310/235 |
| 1,401,016 A | * | 12/1921 | Volet | 310/235 |
| 1,426,105 A | * | 8/1922 | Richter | 29/597 |
| 1,514,321 A | * | 11/1924 | Jeffery | 29/597 |
| 1,550,528 A | * | 8/1925 | Fitzgerald | 29/597 |
| 1,832,456 A | * | 11/1931 | Gilbert | 310/236 |
| 2,188,423 A | * | 1/1940 | Andrews | 29/597 |
| 2,236,257 A | * | 3/1941 | Borchers | 29/597 |
| 2,533,775 A | * | 12/1950 | Durrschmidt | 310/235 |
| 2,645,733 A | * | 7/1953 | Marsal | 29/597 |
| 2,671,866 A | * | 3/1954 | Camprubi | 29/597 |
| 2,826,707 A | * | 3/1958 | Camprubi | 310/234 |
| 2,831,991 A | * | 4/1958 | Perkins | 29/598 |
| 3,079,520 A | * | 2/1963 | Schafer et al. | 264/272.2 |
| 3,566,460 A | * | 3/1971 | Yamaguchi | 310/235 |
| 3,608,350 A | * | 9/1971 | Yamaguchi | 29/597 |
| 3,717,929 A | * | 2/1973 | Yamaguchi | 174/DIG. 7 |
| 3,908,265 A | * | 9/1975 | Heil et al. | 29/597 |
| 3,987,539 A | * | 10/1976 | Gravener | 29/597 |
| 4,035,908 A | * | 7/1977 | Ishi et al. | 29/597 |
| 4,263,711 A | * | 4/1981 | Sakano et al. | 264/272.15 |
| 4,342,933 A | * | 8/1982 | Gerlach et al. | 310/219 |
| 4,559,464 A | * | 12/1985 | Stokes | 29/460 |
| 4,638,202 A | * | 1/1987 | Ebner | 310/235 |
| 4,663,834 A | * | 5/1987 | Stokes | 29/597 |

(List continued on next page.)

FOREIGN PATENT DOCUMENTS

| | | | | |
|---|---|---|---|---|
| JP | 59185137 | * | 10/1984 | H02K/13/00 |
| JP | 6013450 | * | 1/1985 | H02K/13/00 |
| JP | 5103446 | * | 4/1993 | H02K/13/00 |
| JP | 729659 | * | 1/1995 | H02K/13/00 |
| JP | 7-21085 | | 5/1995 | H02K/5/14 |
| JP | 993877 | * | 4/1997 | H02K/13/00 |
| JP | 1155895 | * | 8/1997 | H02K/5/24 |
| JP | 2002153014 | * | 5/2002 | H02K/5/24 |
| RU | 1185460 A | * | 8/1985 | 310/233 |

*Primary Examiner*—Karl Tamai
*Assistant Examiner*—Heba Y. M. Elkassabgi
(74) *Attorney, Agent, or Firm*—Sughrue Mion, PLLC

(57) ABSTRACT

The invention provides a commutator motor capable of reducing vibration and noise generated in commutator motor and improving durability against breakage of armature. A commutator 3 having a conductive section 32 mounted on a rotary shaft 1 through an insulating section 31 is provided with a vibration-isolating member 33 made of rubber by adhesion or integral formation at the location between the conductive section 32 and the rotary shaft 1, for example, between the insulating section 31 and the rotary shaft 1 or between the conductive section 32 and the insulating section 31. In one aspect of the invention, another vibration-isolating member supports a brush holder 4 for holding a brush 41 coming in contact with the commutator 3.

5 Claims, 5 Drawing Sheets

U.S. PATENT DOCUMENTS

| | | | | |
|---|---|---|---|---|
| 4,890,026 A | * | 12/1989 | Isozumi | 310/233 |
| 4,920,633 A | * | 5/1990 | Wojcik | 29/597 |
| 5,003,212 A | * | 3/1991 | Ibe et al. | 310/235 |
| 5,124,609 A | * | 6/1992 | Nagasaka | 310/233 |
| 5,204,574 A | * | 4/1993 | Kanno et al. | 310/233 |
| 5,231,321 A | * | 7/1993 | Takiguchi | 310/51 |
| 5,272,405 A | * | 12/1993 | Terada | 310/236 |
| 5,422,528 A | * | 6/1995 | Prahl | 29/597 |
| 5,650,683 A | * | 7/1997 | Shiga et al. | 310/201 |
| 5,696,418 A | * | 12/1997 | Corbach et al. | 310/239 |
| 5,977,666 A | * | 11/1999 | Horski et al. | 310/238 |
| 6,057,626 A | * | 5/2000 | Tanaka et al. | 29/597 |
| 6,181,046 B1 | * | 1/2001 | Daikoku et al. | 310/236 |
| 6,239,531 B1 | * | 5/2001 | McGaughey | 310/233 |
| 6,307,296 B1 | * | 10/2001 | Schmidt et al. | 310/233 |
| 6,369,484 B1 | * | 4/2002 | Kageyama et al. | 310/233 |
| 6,448,683 B2 | * | 9/2002 | Wiesler et al. | 310/235 |
| 2002/0008430 A1 | * | 1/2002 | Tanaka et al. | 310/68 C |
| 2002/0130584 A1 | * | 2/2002 | Kamiya et al. | 310/233 |

* cited by examiner

COMMUTATOR MOTOR WITH A VIBRATION-ISOLATING MEMBER AROUND SHAFT

BACKGROUND OF THE INVENTION

1. Technical Field

The present invention relates to a commutator motor provided with a commutator.

2. Background of Art

FIG. 9 is a sectional view of a conventionally used commutator motor. In FIG. 9, the commutator motor 10 is mainly comprised of a rotary shaft 1, an armature 2, a commutator 3, a brush holder 4, a brush 41, a brush casing 42, a magnet 5, a yoke 6, a bearing 7, and a housing 8. Further, the commutator 3 has a conductive section 32 mounted on the rotary shaft 1 through an insulating section 31 disposed between the conductive section 32 and the rotary shaft 1, the rotary shaft 1 is pressed into and held in the hole in the center of the insulating section 31, and the conductive section 32 is brought into contact with the brush 41.

In the structure of the commutator motor 10 constituted as above, when rotating the armature 2, vibration is generated in the contact portion between the brush 41 and the commutator 3. A hard material of a high mechanical strength, for example, thermosetting resin like thermoset phenolic resin, forms the insulating section 31 of the commutator 3. Thus, the insulating section 31 can securely hold the rotary shaft that is pressed into the insulating section 31. Since the commutator 3 behaves, due to the mentioned structure, as a rigid body as a whole, the vibration described above is directly transmitted to the rotary shaft 1 without attenuation in the commutator 3. The vibration is then transmitted to the bearing 7 incorporated in the rotary shaft 1 and further to the yoke 6. Such transmission of vibration is one of the causes of vibration and noise generated in the commutator motor 10. Furthermore, the torque of the commutator motor 10 is transmitted from the armature 2 to the output side and the torque thus transmitted in the commutator motor 10 gives rise to a torsional strain in the direction of rotation along the rotary shaft 1. This torsional strain brings about positional displacement in the direction of rotation between the commutator 3 and an armature core 21, and consequently the armature coil 22 is subjected to tensile stress. This stress is one of the causes responsible for coil breakage due to fatigue fracture.

The Japanese Utility Model Publication (examined) No. 21085/1995 has disclosed a technique of giving a floating support to a brush holder forming a part of a housing by using rubber bushes for end-brackets, for the purpose of absorbing vibration in radial and axial directions due rotation of an armature in a commutator motor. This known technique is, however, not always sufficient to prevent the mentioned vibration and noise of a commutator motor.

SUMMARY OF THE INVENTION

In view of the above-discussed problems incidental to the conventional commutator motor, it is an object of the present invention to reduce vibration and noise generated in commutator motor, and to improve durability against breakage of armature coil.

(1) A commutator motor according to the invention comprises: a commutator having a conductive section mounted on a rotary shaft through an insulating section between the conductive section and the rotary shaft; and a vibration-isolating member disposed between the conductive section and the rotary shaft.

(2) In the commutator motor according to the mentioned paragraph (1), the vibration-isolating member is formed on an inner surface of the insulating section, the inner surface facing the rotary shaft, by adhesion to or integral formation with the insulating section.

(3) In the commutator motor according to the mentioned paragraph (1), the vibration-isolating member is formed between the conductive section and the insulating section by adhesion to or integral formation with these two sections.

Accordingly, vibration developed in the contact portion between a brush and the commutator due to rotation of the armature, is absorbed by the vibration-isolating member prepared in various forms as described above, whereby the commutator motor is prevented from occurrence of vibration and noise generated. Furthermore, due to the absorption of vibration by the vibration-isolating member, the mentioned torsional strain does not occur, and consequently the problem associated with fatigue fracture of armature coil can be solved.

(4) In the commutator motor according to any of the above-mentioned paragraphs (1) to (3), the vibration-isolating member has protrusions embedded in the insulating section in a radial direction of the rotary shaft. Accordingly, the protrusions exhibit an advantage of preventing positional displacement of the vibration-isolating member in an axial direction with respect to the insulating section.

(5) In the commutator motor according to the mentioned paragraph (1), the commutator motor further comprises a brush holder section for holding a brush coming in contact with the commutator, and in which another vibration-isolating member supports the bush holder section. Accordingly, in addition to isolation of vibration by the vibration-isolating member disposed between the conductive section and the rotary shaft as described above, another way of preventing vibration is provided by another vibration-isolating member. As a result, the commutator motor is more securely prevented from occurrence of vibration and noise. Furthermore, any torsional strain along the rotary shaft does not occurs, whereby the problem associated with fatigue fracture of the armature coil is solved.

(6) In the commutator motor according to the mentioned paragraphs (1) or (5), the vibration-isolating member is made of rubber. Accordingly, excellent elasticity of rubber can provide a great vibration-isolating effect.

DESCRIPTION OF THE PREFERRED EMBODIMENTS

Figure 1:
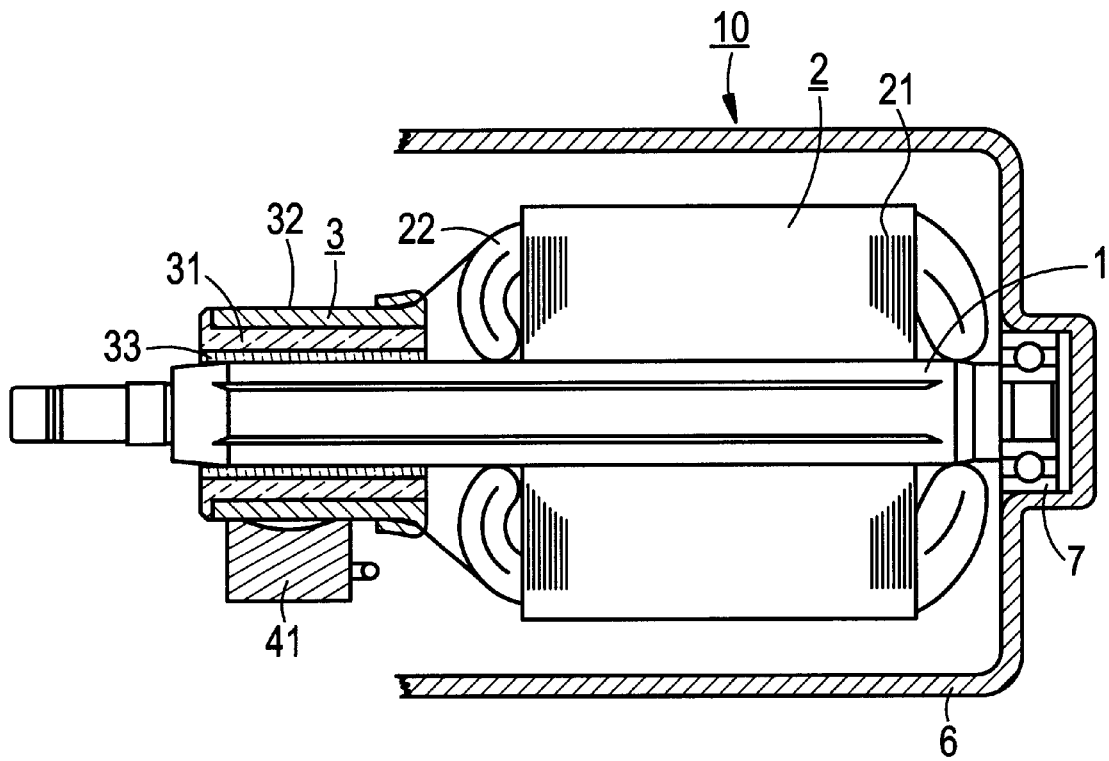
FIG. 1 is a sectional view of a commutator motor according to Embodiment 1 of the present invention, with a part thereof omitted.

In the Embodiments 1 to 4 described below, the same reference numerals are designated to the same or like parts and further description thereof are omitted herein.

EMBODIMENT 1

Figure 2:
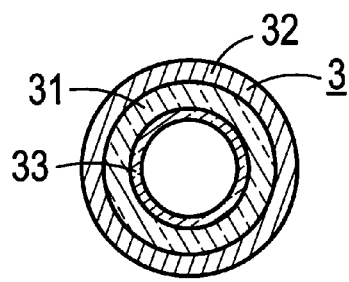
FIG. 2 is a radial sectional view of a commutator 3 used in FIG. 1.

FIGS. 1 and 2 explain a commutator motor according to Embodiment 1 of the present invention. FIG. 1 is a partially cut out sectional view of the commutator motor 10, and FIG. 2 is a radially sectional view of the commutator 3 in FIG. 1. In FIGS. 1 and 2, reference numeral 33 shows a vibration-isolating member. FIG. 1 is different from FIG. 9 in the aspect that the vibration-isolating member 33 is added in FIG. 1, and constitution of the other elements in FIG. 1 is the same as that in FIG. 9. The vibration-isolating member 33 is adhered with an adhesive (not shown) to the inner surface facing the rotary shaft 1 of the insulating section 31 in the commutator 3. Thus, the commutator 3 in this Embodiment 1 has a structure having the vibration-isolating member 33 in innermost part, on which the insulating section 31 and the conductive section 32 are disposed in order. The vibration-isolating member 33 absorbs vibration developed in the contact portion between the brush 41 and the commutator 3 due to rotation of the armature 2. As a result, the commutator motor is prevented from occurrence of vibration and noise.

Furthermore, the above-mentioned vibration absorption by the vibration-isolating member 33 is also effective for reducing the amount of torsional strain in the rotary shaft 1. As a result, a great advantage is exhibited such that the problem associated with fatigue fracture of the armature coil 22 is solved, whereby the commutator motor 10 is improved in durability.

Figure 9:
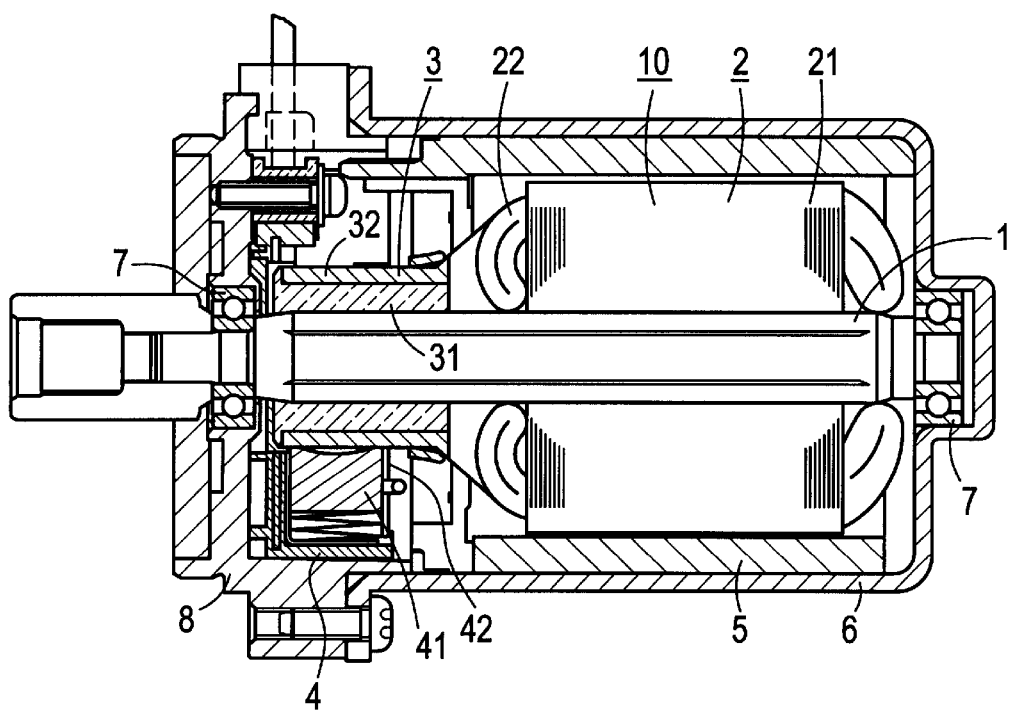
FIG. 9 is a sectional view of a commutator motor according to the prior art.

In the commutator motor 10 in this Embodiment 1, the commutator 3 of three-layer structure shown in FIGS. 1 and 2 is employed instead of the commutator 3 shown in FIG. 9, and it is possible to assemble the commutator motor by pressing the rotary shaft 1 in the hole provided in the center of the commutator 3, i.e., center hole of the vibration-isolating member 33.

There is no restriction in selecting constituent materials of the vibration-isolating member 33 as long as they can absorb vibration generated in the contact portion between the brush 41 and the commutator 3. In general, it is preferable to employ elastic materials such as rubber. Among many types of rubber, the followings are preferred: ethylene-propylene copolymer rubber (EPM), ethylene-propylene-diene ternary copolymer rubber (EPDM), ethylene-vinyl acetate copolymer rubber, isoprene rubber, acrylonitrile-butadiene rubber, styrene butadiene rubber, chloroprene rubber, butyl-rubber, epichlorohydrin rubber, silicon rubber, fluorine rubber, and cross-linking-based polymer including cross-linking rubber like natural rubber, or various types of thermoplastic elastomer.

When the insulating section 31 is formed of a thermosetting resin like thermosetting phenol resin, such insulating section 31 and the vibration-isolating member 33 made of the above-mentioned rubber can be adhered to each other with an adhesive such as elastomer-metamorphic-epoxy adhesive or a rubber cement prepared by dissolving petroleum resin like rosin and not-yet-cross-linked rubber in an organic solvent. In the case that a rubber of low polarity such as EPM or EPDM is used, it is preferable to apply a primer or a surface treatment to the adhered face of the vibration-isolating member 33 for improving adhesion properties before application of the adhesive.

EMBODIMENT 2

In this Embodiment 2, the vibration-isolating member is integrally formed with the insulating section and disposed in position. This Embodiment 2 is different from the foregoing Embodiment 1 only in this respect, and the constitution of the other elements is the same as that in the foregoing Embodiment 1. The commutator whose vibration-isolating member and insulating section are integrally formed can be manufactured, for example, by the steps of heating the conductive element forming an conductive section 32, not-yet-set thermosetting resin, and not-yet-cross-linked rubber inside a mold under pressure, and causing the thermosetting resin to set and the rubber to cross-link.

EMBODIMENT 3

Figure 3:
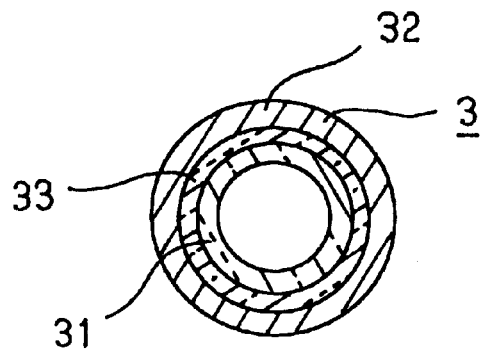
FIG. 3 is a radial sectional view of a commutator used in a commutator motor according to Embodiment 3 of the invention.

FIG. 3 is a radially sectional view of a commutator 3 to explain a commutator motor according to Embodiment 3 of the invention. The commutator 3 in this Embodiment 3 is different from that in FIG. 2 in the aspect that the vibration-isolating member 33 is located between the insulating section 31 and the conductive section 32 and is adhered to both sections with an adhesive (not shown), and the remaining constitution is the same as that in the foregoing Embodiment 1.

EMBODIMENT 4

In this Embodiment 4, the vibration-isolating member located between the conductive section and the insulating section is integrally formed with both sections. Accordingly, this Embodiment 4 is different from the foregoing Embodiment 3 only in this respect and the remaining constitution is the same as that in the foregoing Embodiment 3.

EMBODIMENT 5

Figure 4:
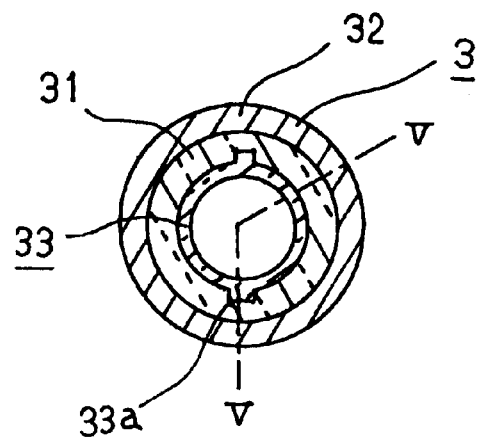
FIG. 4 is a radial sectional view of a commutator used in a commutator motor according to Embodiment 5 of the invention.
Figure 5:
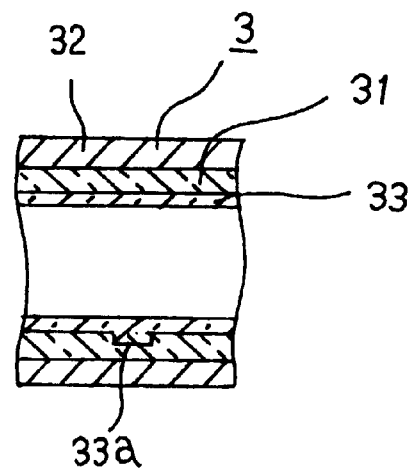
FIG. 5 is a sectional view taken along the line V—V in FIG. 4.

FIGS. 4 and 5 are to explain a commutator motor according to Embodiment 5 of the invention. FIG. 4 is a radially sectional view of a commutator 3 and FIG. 5 is a sectional view taken along the line V—V in FIG. 4. The commutator 3 in this Embodiment 5 is different from that shown in FIG. 2 in the aspect that the vibration-isolating member 33 has protrusions 33a and the remaining constitution the same as that in the foregoing Embodiment 1. The protrusions 33a are laid inside the insulating section 31 in a radial direction of the rotary shaft (not shown), whereby it is possible to prevent positional displacement of the vibration-isolating member in an axial direction with respect to the insulating section.

EMBODIMENT 6

In this Embodiment 6, the vibration-isolating member located between the conductive section and the insulating section is integrally formed with both sections. Accordingly, this Embodiment 6 is different from the foregoing Embodiment 5 only in this respect and the remaining constitution is the same as that in the foregoing Embodiment 5.

EMBODIMENT 7

Figure 6:
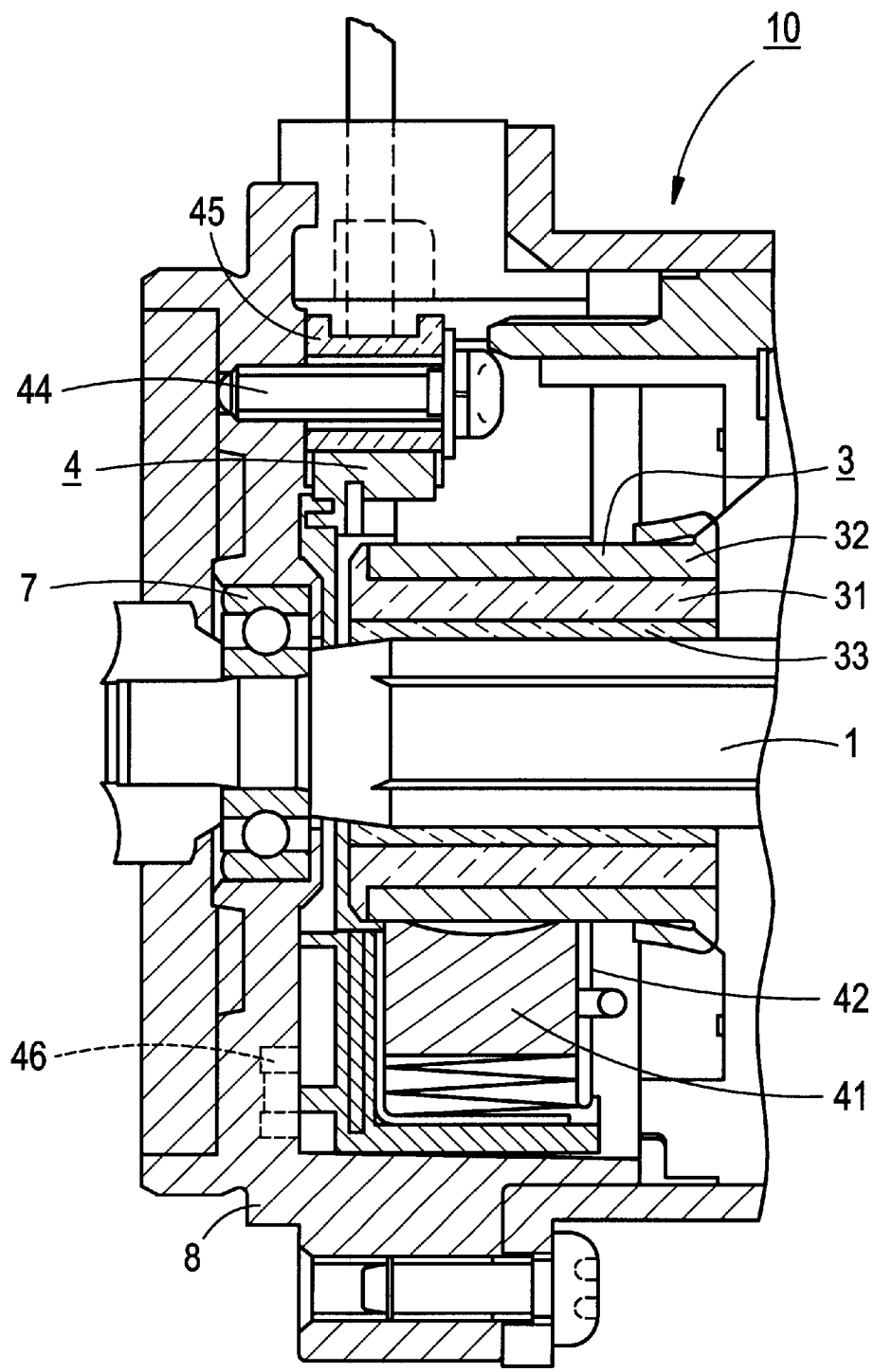
FIG. 6 is a partially enlarged sectional view of a commutator motor according to Embodiment 7 of the invention.
Figure 7:
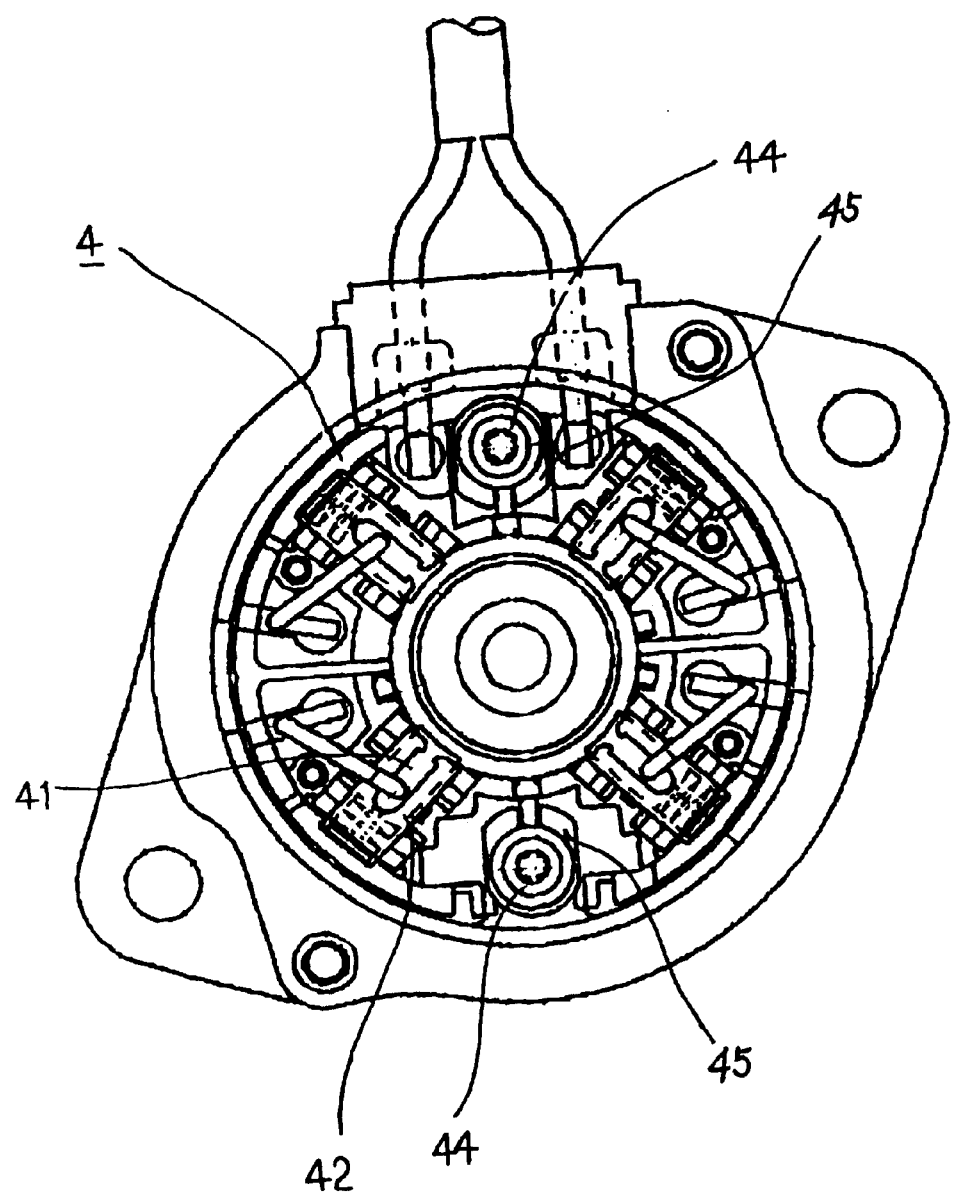
FIG. 7 is a plan view of a brush holder used in Embodiment 7.
Figure 8:
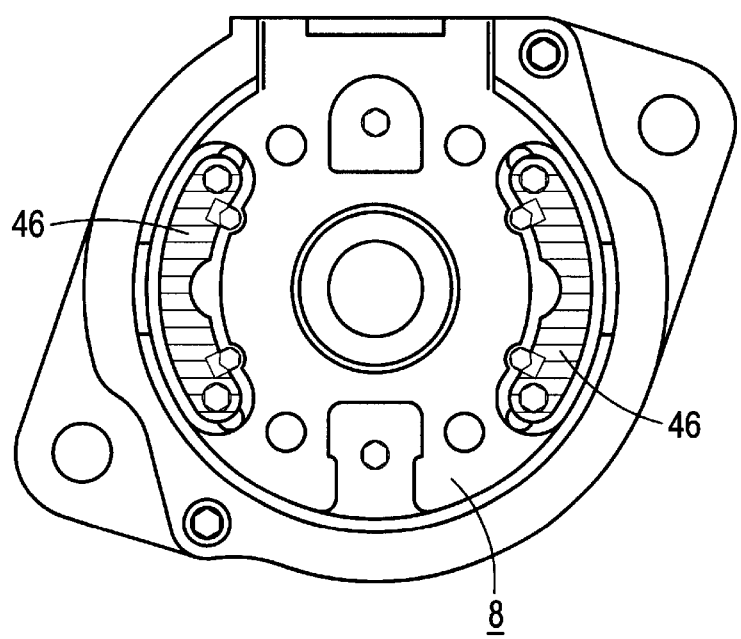
FIG. 8 is a plan view showing a state after removing the brush holder and other parts from FIG. 7.

FIGS. 6 to 8 are to explain a commutator motor 10 according to Embodiment 7 of the invention. The reference numbers used in FIGS. 6 to 8 that are common to FIG. 1 designate the same elements as FIG. 1. Thus, the description of these elements is not repeated here. FIG. 6 is a partially enlarged sectional view of the commutator motor 10, FIG. 7 is a plan view of a brush holder 4, and FIG. 8 is a plan view of a state after removing the brush holder and other parts from FIG. 7. In FIGS. 6 to 8, numeral 41 is a brush, numeral 42 is a brush casing, numeral 44 is a screw, numeral 45 is a rubber bush, and numeral 46 is a rubber sheet. The rubber bush 45 and rubber sheet 46 are another example of vibration-isolating member that is different from that employed in the foregoing Embodiments 1 to 6.

The brush holder 4 is secured with the screw 44 to a housing 8 through the rubber bush 45 between the bush holder 4 and the housing 8. The rubber sheet 46 (indicated by many horizontal lines in FIG. 8) is secured onto the surface of the brush holder 4 facing to the housing 8, thus the brush holder 4 is in contact with the housing 8 holding the rubber sheet 46 between them.

In this Embodiment 7, the commutator 3 has the vibration-isolating member 33 innermost in the same manner as in the foregoing Embodiment 1. Therefore, in addition to the isolation of vibration rendered by the vibration-isolation element 33, a further isolation of vibration is applied by the rubber bush 45 and rubber sheet 46. As a result, the commutator motor 10 can be prevented more effectively from occurrence of vibration and noise, and the rotary shaft 1 can be also prevented from torsional strain. As for the material constituting the rubber bush 45 and the rubber sheet 46, it is preferred to employ the aforementioned rubber and other materials suitable for the vibration-isolating member 33.

What is claimed is:

1. A commutator motor comprising:

a commutator having a conductive section mounted on a rotary shaft through an insulating section between the conductive section and the rotary shaft; and a vibration-isolating member disposed between the conductive section and the rotary shaft;

wherein the vibration-isolating member has protrusions embedded in the insulating section in a radial direction of the rotary shaft so as to prevent positional displacement of the vibration-isolating member in an axial direction with respect to the insulating section.

2. The commutator motor according to claim 1, wherein the vibration-isolating member is formed on an inner surface of the insulating section, said inner surface facing the rotary shaft, by adhesion to or integral formation with said insulating section.

3. The commutator motor according to claim 1, wherein the vibration-isolating member is formed between the conductive section and the insulating section by adhesion to or integral formation with said two sections.

4. The commutator motor according to claim 1, further comprising a brush holder section for holding a brush coming in contact with the commutator, wherein another vibration-isolating member supports said bush holder section.

5. The commutator motor according to claim 1, wherein the vibration-isolating member is made of rubber.

* * * * *